United States Patent Office 3,343,582
Patented Sept. 26, 1967

3,343,582
COVULCANIZATE COMPRISING POLYISOPRENE, ETHYLENE-PROPYLENE-DIENE RUBBER, AND CONJOINT ACCELERATORS
Glenn R. Himes, Torrance, and Dean E. Carter, Fullerton, Calif., assignors to Shell Oil Company, New York, N.Y., a corporation of Delaware
No Drawing. Filed Jan. 27, 1965, Ser. No. 428,532
7 Claims. (Cl. 152—330)

ABSTRACT OF THE DISCLOSURE

A vulcanizable rubber composition is provided comprising mixtures of synthetic polyisoprene, and an interpolymer of at least two alpha olefins with a diolefin, the mixture containing as cure accelerators a benzothiazyl sulfide compound, and aryl-substituted guanidine and a thiuram sulfide.

This invention relates to rubber compositions. More particularly, it relates to compositions having an optimum state of cure comprising a synthetic or natural polyisoprene elastomer combined in certain proportions with sulfur-vulcanizable interpolymers of alpha olefins with dienes. The invention especially relates to a particular combination of accelerators useful for forming improved vulcanizates of these rubber compositions.

The art of vulcanizing natural and synthetic rubbers has been investigated in many aspects and a large number of vulcanizing agents and vulcanization accelerators have been utilized and marketed for this purpose. The main problem involved in the vulcanization of a given type of rubber is to utilize an optimized combination of vulcanizing agent and accelerator to obtain the desired set of physical properties in the vulcanizate. While this can be achieved without too great a difficulty when a single type of rubber is involved, e.g., polyisoprene or SBR, the problem becomes much more complex when combinations of several types of elastomers must be vulcanized. In this latter instance, it will immediately be seen that the problem of vulcanization comprises the search for a vulcanizing recipe which will provide optimum physical properties in the combined vulcanizate. If the two types of rubbers employed in such mixtures differ widely in their original unsaturation, the search is by no means simple and the result is most certainly unpredictable.

Another problem often encountered in the utilization of rubbers and particularly of conjugated diene rubbers is that of their sensitivity toward ozone. This is especially true in certain situations typified by white sidewalls forming a structural component of pneumatic tires where ozone cracking is often evident after relatively short periods of use. The ozone resistance of alpha olefin elastomers is known in the art but the difficulty heretofore has been to combine such elastomers with conjugated diene rubbers and with a combination of vulcanizing agent and accelerators to arrive at satisfactory physical properties in the composition.

It is an object of the present invention to provide improved rubber blends. It is a further object of the invention to provide improved conjugated diene rubbers blended with alpha olefin polymers. It is a particular object of the invention to provide rubber compositions exhibiting improved resistance to ozonolysis. A special object of the invention is to provide such compositions having other desired combinations of physical properties such as high tensile strength and the like. Other objects will become apparent during the following detailed description of the invention.

Now, in accordance with the present invention, compositions having improved resistance to ozonolysis and high tensile strength as well as other desirable properties are provided comprising a combination of homopolyisoprene rubber and an interpolymer of two alpha olefins interpolymerized with certain dienes defined hereinafter in a sufficient proportion to provide a sulfur-vulcanizable elastomer having an iodine number between about 3 and 60, the weight ratio of polyisoprene to interpolymer being between about 80:20 and 55:45, said compositions being cured with a vulcanization recipe including a defined combination of specific classes of cure accelerators.

In accordance with the invention, a sulfur curable composition comprising the above blend of elastomers is provided wherein the sure is optimized by a combination of three types of accelerators, namely, a benzothiazyl sulfide compound, an aryl-substituted guanidine and a thiuram sulfide.

Still in accordance with the invention, a pneumatic tire is provided having at least a sidewall component thereof comprising a molded and vulcanized rubber compound comprising the above blend of rubbers vulcanized with sulfur in the presence of the recited combination of vulcanization accelerators. If more than about 50% of the subject terpolymers are present, the white sidewall compositions have been found to delaminate from standard black tire carcass stocks.

The unexpected features of the present invention comprise particularly the unusual degree of ozone resistance imparted to homopolyisoprene which is normally highly susceptible to ozonolysis combined with the optimum vulcanization of the blend of rubbers, as long as the proportion of the latter is within the recited range. The unpredictable feature of the invention includes particularly the critical combination of vulcanization accelerators which will be more fully discussed hereinafter.

The predominating elastomer in the compositions of this invention is homopolymeric isoprene derived from natural sources or by synthetic means. Homopolyisoprene rubbers are known in the art and preferably have a cis 1,4-content higher than about 85% as well as having an intrinsic viscosity between about 2 and 10, preferably between about 3 and 8. The processes by which such polyisoprenes may be obtained do not form an essential part of the present invention. They are usually obtained by a solution mechanisms utilizing either alkyl lithium catalyst or certain Ziegler-types of catalysts.

The interpolymers of alpha olefins combined with homopolyisoprene comprise ethylene, at least one alpha olefin having the structure $R\text{---}CH\text{=}CH_2$ wherein R is a $C_{1-8}$ alkyl radical and at least one diene of the group consisting of a 5-methylene 2-norbornene, a dicyclopentadiene, and an aliphatic open chain diolefin containing 5–22 carbon atoms in which the double bonds are separated by more than two carbon atoms and in which at least one double bond is terminally located, the diolefin comprising from about 1 to 40 mol percent of the interpolymer, said interpolymer having an iodine number of from 3 to 60. The preferred alpha olefin species are propylene or butylene but may comprise higher alpha olefins such as pentenes, hexenes, octene, or decene. The proportion of the alpha olefin higher than ethylene is adjusted together with the proportion of diene component such that the polymer possesses elastomeric properties. The presence of the diene is especially for the purpose of providing a sulfur-vulcanizable elastomer composition which at the same time possesses an optimum degree of saturation.

The open chain dienes which may be employed in the formation of the subject interpolymers preferably have a straight chain of 5–22 carbon atoms in either a straight or branched chain. Examples of suitable diolefins in which both double bonds are terminal are 1,4-pentadidiene; 1,5-hexadiene; 2-methyl-1,5-hexadiene; and 1,9-decadiene. A preferred form of the present invention involves diolefins in which only one double bond is terminal. Examples of such compounds include 1,4-hexadiene; 1,9-octadecadiene; 6-methyl-1,5-heptadiene; and simpler compounds in which the internal double bond is shielded. The interpolymers made from such dienes and the mixtures of alpha olefins contain from about 1 to 40 mol percent of the diolefin and preferably from 1 to 15%.

Copolymers including a mixture of alpha olefins and a dicyclopentadiene are typified by the following: ethylene-propylene-dicyclopentadiene terpolymer, which is preferred, ethylene-1-butene-dicyclopentadiene terpolymer, ethylene-propylene-1-butene-dicyclopentadiene quaterpolymer, ethylene-1-octene-dicyclopentadiene terpolymer, ethylene-propylene-1-hexene-dicyclopentadiene quaterpolymer, ethylene-1-heptene-1-dicyclopentadiene quaterpolymer, and, ethylene-5-methyl-1-heptene-dicyclopentadiene terpolymer.

In order that this class of copolymers be elastomeric, they should contain at least about 20% ethylene monomer unit by weight, at least about 25% of higher alpha olefin monomer unit, and no more than about 10% by weight of a dicyclopentadiene unit. The dicyclopentadiene nucleus may be substituted by alkyl radicals as long as the double bonds are not thereby removed and the reactivity of the compound relative to its ability to form copolymers with alpha olefins is not materially impaired. The concentration of alpha olefin higher than ethylene ranges in general from about 25% to about 79.5%.

Typical copolymers having a 5-methyl-2-norbornene as the diene include the following:

Ethylene/propylene/5-methylene-2-norbornene;
Ethylene/1-butene/5-methylene-2-norbornene;
Ethylene/1-decene/5-methylene-2-norbornene;
Ethylene/5,5-dimethyl-1-octene/5-methylene-2-norbornene;
Ethylene/4-methyl-1-hexene/5-methylene-2-norbornene;
Ethylene/4,4-dimethyl-1-pentene/5-methylene-2-norbornene;
Ethylene/5,6,6-trimethyl-1-heptene/5-methylene-2-norbornene.

As stated hereinbefore, the principal problem in the utilization of a blend of such diverse types of elastomers as a polyisoprene with the subject alpha olefin interpolymers is that of working out a curing system which will provide an optimum combination of physical properties in the vulcanizate. Hence, the important aspect of this invention comprises the discovery of a combination of vulcanization accelerators to be utilized in the vulcanizing of the subject elastomer blend in combination with a sulfur vulcanization agent. In the following discussion and claims, the term "phr." is used as a convenient means for referring to parts per 100 of rubber (polyisoprene plus interpolymers) on a weight basis. The combination of cure accelerators is as follows:

| | Phr. |
|---|---|
| Benzothiazyl sulfide compounds | 0.25–2.5 |
| Aryl-substituted guanidine | 0.1–1.0 |
| Thiuram sulfide | 0.025–0.5 |

Optimum proportions of the benzothiazyl sulfide lie between 0.5 and 1.0 phr. Suitable benzothiazyl sulfide compounds include particularly the following:

Benzothiazyl disulfide
Zn salt of 2-mercaptobenzothiazole
2-mercaptobenzothiazole
N-oxydiethylene benzothiazole 2-sulfenamide
N-cyclohexyl benzothiazole 2-sulfenamide The preferred species in this category is benzothiazyl disulfide.

One of the particularly unexpected features of this invention lies in the essential use of a diaryl guanidine in order to obtain maximum vulcanizate properties. This is in direct contrast to the statements contained in the brochure issued by one of the manufacturers of sulfur-vulcanizable interpolymer of the type being considered here, wherein the brochure states in part "the use of accelerators such as . . . guanidines . . . has produced poor cures in (the described alpha olefin-diene elastomers)." In spite of this statement the present invention comprises the use of such aryl substituted guanidines as the following:

Diphenyl guanidine
Mixed diarylguanidines
Di-o-tolylguanidine
Triphenylguanidine Of these, diphenyl guanidine is the preferred species and it is preferably present in a proportion between about 0.2 and 0.5 phr.

The third class of essential accelerator to be used in accordance with the present invention comprise a thiuram sulfide which is preferably present in a proportion between about 0.025–0.5 phr. Suitable thiuram sulfides include the following:

Tetramethylthiuram monosulfide
Tetraethylthiuram disulfide
Tetramethylthiuram disulfide
Dipentamethylenethiuram tetrasulfide Of these, the preferred species is tetramethylthiuram monosulfide.

An optimum combination of the preferred species in the preferred proportions is therefore as follows:

| | Phr. |
|---|---|
| Benzothiazyl disulfide | 0.5–1.0 |
| Diphenyl guanidine | 0.2–0.5 |
| Tetramethylthiuram monosulfide | 0.05–0.2 |

Another important component of the subject rubber compounds is a suitable antioxidant which ordinarily would be one or more arylamines or substituted phenols of which the following are suitable commercially available species:

2,2'-methylene-bis(4-methyl-6-tertbutylphenol)
2,2'-methylene-bis(4-ethyl-6-tertbutylphenol)
Diphenyl-phenylene diamine
Phenyl-alpha-naphthylamine
Meta-toluylenediamine
Phenyl beta-naphthylamine The vulcanizing recipe for the subject combination of elastomers includes essentially sulfur together with other components recognized in the art, such as zinc oxide 2–50 phr.), stearic acid (1–5 phr.), pigments, fillers, such as clay, titania silica and (except in white stock) carbon blacks. The proportions of these pigments and fillers may be adjusted according to particular end uses and do not form an essential part of the present invention. The presence of polyalkylene glycols such as polyethylene glycol in a proportion of about 0.1–1 phr. is desirable when fillers or pigments such as silica or clay are utilized.

The following examples illustrate a preferred composition according to the invention:

*Example I*

The formulation is intended as a typical white sidewall compound showing marked improvement in static ozone resistance over unmodified polyisoprene, while at the same time a high tensile strength is obtained by the use of the described combination of accelerators. The ethylene-propylene terpolymer (55:45:5 ethylene-propylene-diene mol ratio) has a iodine number of about 10, a Mooney viscosity ML–4 at 212° F. of 140, the diene employed in the terpolymer to provide the sulfur-vulcanizable diene sites being dicyclopentadiene. The isoprene rubber is a synthetic polyisoprene having a cis 1,4-content of about 92% an intrinsic viscosity at 23° C. of 8. The formula was as follows:

|  | Phr. |
|---|---|
| Polyisoprene rubber | 70–75 |
| Ethylene-propylene terpolymer | 25–30 |
| Stearic acid | 2.0 |
| Zinc oxide | 30.0 |
| Sulfur | 1.5 |
| Benzothiazyl disulfide | 0.7 |
| Diphenyl guanidine | 0.3 |
| Tetramethylthiuram monosulfide | 0.1 |
| Polyethylene glycol | 0.5 |
| 2,2'-methylene bis(4-methyl-6-tertbutylphenol) | 2.0 |
| Clay | 30.0 |
| Titanium dioxide | 30.0 |

The formulation containing 70 parts of polyisoprene and 30 parts of the terpolymer showed no cracking after 350 hours in a cabinet maintained at 57° C. containing an ozone concentration of 50 parts per 100 million, was given a ten rating on a 0–10 scale; while both pale natural crepe rubber and unmodified synthetic polyisoprene controls cracked severely and were given a four rating in the same test. Prior to the ozone test, the vulcanized blend had a tensile strength at 73° F. of 1,650 p.s.i.

A comparative formula containing 75 parts polyisoprene and 25 parts by weight of the terpolymer had a rating of 8 after 300 hours in the same ozone cabinet test and had a tensile strength prior to the test after vulcanization of about 1,800 p.s.i.

*Example II*

Comparative tests were performed on a blend of 70 parts by weight of synthetic polyisoprene and 30 parts of the same terpolymer referred to in Example I. Table I presents data obtained on a number of accelerator combinations. It will be seen that superior results are obtained by the combination of the three types of accelerators. Furthermore, if one (or more) of the accelerators is omitted, the compound are deficient either in ozone rating or tensile strength.

TABLE I

|  | Compound No. | | | | | | |
|---|---|---|---|---|---|---|---|
|  | 1 | 2 | 3 | 4 | 5 | 6 | 7 |
| Zinc oxide | 30 | 30 | 30 | 30 | 30 | 30 | 30 |
| Benzothiazyl disulfide |  |  | 1.0 |  | 0.7 | 0.7 | 0.7 |
| Polyethylene glycol | 0.25 | 0.25 | 0.20 | 0.25 | 0.05 | 0.10 | 0.20 |
| N-cyclohexylbenzothiazole 2-sulfenamide | 0.7 | 0.5 |  | 0.3 |  |  |  |
| Diphenyl guanidine |  | 0.2 | 0.5 | 0.5 | 0.3 |  | 0.3 |
| Tetramethylthiuram monosulfide |  |  |  |  | 0.1 | 0.1 | 0.1 |
| Sulfur | 1.5 | 1.5 | 1.5 | 1.5 | 1.5 | 1.5 | 1.5 |
| Titanium dioxide | 30 | 30 | 30 | 30 | 30 | 30 | 30 |
| Clay | 30 | 30 | 30 | 30 | 30 | 30 | 30 |
| Stearic acid | 2.0 | 2.0 | 2.0 | 2.0 | 2.0 | 2.0 | 2.0 |
| Antioxidant | 2.0 | 2.0 | 2.0 | 2.0 | 2.0 | 2.0 | 2.0 |
| Ozone rating (300 hr. at 50 p.p.h.m. O₃) |  | 10 | 7 | 8 | 10 | 10 | 10 |
| Tensile for 15' cure at 310° F | 1,400 | 1,500 | 1,650 | 1,600 | 1,630 | 1,640 | 1,620 |

Note.—All amounts in parts by weight per 100 parts total polymer (phr.).

*Example III*

Compositions were prepared and tested comprising 70 parts natural crepe rubber and 30 parts the terpolymer described in Example I. Essentially the same results were obtained when replacing the terpolymer with a terpolymer having the mol ratio of 65:35:5 ethylene:propylene:dicyclopentadiene. The cure recipe was the same as that of sample 7, Table I. The resulting compound had an ozone rating of 10 and a tensile strength at break of 2,580 p.s.i. after a cure of 5 minutes at 310° F.

We claim as our invention:

1. A blend of an uncured synthetic homopolyisoprene rubber and an interpolymer rubber, said interpolymer being of ethylene, at least one alpha olefin having the structure R—CH=CH$_2$ wherein R is a $C_{1-8}$ alkyl radical, and at least one diene of the group consisting of a t-methylene-2-norbornene, dicyclopentadiene, and an aliphatic open chain diolefin containing 5–22 carbon atoms in which the double bonds are separated by more than 2 carbon atoms and in which at least one double bond is terminally located, the diolefin comprising from about 1 to 40 mol percent of the interpolymer, said interpolymers having an iodine number of from 3 to 60, the weight ratio of polyisoprene to interpolymer being between about 80:20 and 60:40 and, as cure accelerators therefor a combination of:

|  | Phr. |
|---|---|
| (1) A benzothiazyl sulfide compound | 0.25–2.5 |
| (2) An aryl-substituted guanidine and | 0.1–1.0 |
| (3) A thiuram sulfide | 0.025–0.5 |

2. A composition according to claim 1 containing in addition 0.5–5 phr. sulfur.

3. A composition of matter highly resistant to deterioration by the action of ozone comprising a sulfur-cured composition according to claim 2.

4. A pneumatic tire having a sidewall portion comprising a molded and vulcanized rubber compound according to claim 3.

5. A sulfur-curable composition comprising:
  (a) a blend of
    (1) a synthetic polyisoprene rubber and
    (2) a terpolymer of ethylene, propylene, and dicyclopentadiene, said terpolymer having an iodine number of 15–50;
  the weight ratio of polyisoprene to interpolymer being between about 75:25 and 65:35; and
  (b) as cure accelerators therefor a combination of:

|  | Phr. |
|---|---|
| (1) benzothiazyl disulfide | 0.5–1.0 |
| (2) diphenyl guanidine and | 0.2–0.5 |
| (3) tetramethylthiuram monosulfide | 0.05–0.2 |

6. A sulfur-curable composition comprising:
  (a) a blend of
    (1) a synthetic polyisoprene rubber and
    (2) a terpolymer of ethylene, propylene and 5-methylene-2-norbornene, said terpolymer having an iodine number of 15–50;
  the weight ratio of polyisoprene to interpolymer being between about 75:25 and 65:35; and
  (b) as cure accelerators therefor a combination of:

|  | Phr. |
|---|---|
| (1) benzothiazyl disulfide | 0.5–1.0 |
| (2) diphenyl guanidine and | 0.2–0.5 |
| (3) tetramethylthiuram monosulfide | 0.05–0.2 |

7. A sulfur-curable composition comprising:
  (a) a blend of
    (1) a synthetic polyisoprene rubber and (2) a terpolymer of ethylene, propylene, and 1,5-hexadiene, said terpolymer having an iodine number of 15–50;

the weight ratio of polyisoprene to interpolymer being between about 75:25 and 65:35; and (b) as cure accelerators therefor a combination of:

| | Phr. |
|---|---|
| (1) benzothiazyl disulfide | 0.5–1.0 |
| (2) diphenyl guanidine and | 0.2–0.5 |
| (3) tetramethylthiuram monosulfide | 0.05–0.2 |

References Cited
UNITED STATES PATENTS

| | | | |
|---|---|---|---|
| 2,933,480 | 4/1960 | Gresham | 260—80.5 X |
| 3,136,739 | 6/1964 | Adamek et al. | 260—889 |
| 3,224,985 | 12/1965 | Gladding et al. | 260—889 |

SAMUEL H. BLECH, *Primary Examiner.*

MURRAY TILLMAN, *Examiner.*

M. J. TULLY, *Assistant Examiner.*